US012691458B2

(12) United States Patent
Van Der Upwich

(10) Patent No.: US 12,691,458 B2
(45) Date of Patent: Jul. 28, 2026

(54) FILTER DEVICE FOR REMOVING PARTICLES FROM A FLUID

(71) Applicant: MST NL B.V., Huizen (NL)

(72) Inventor: Stijn Van Der Upwich, Enkhuizen (NL)

(73) Assignee: MST NL B.V., Huizen (NL)

( * ) Notice: Subject to any disclaimer, the term of this patent is extended or adjusted under 35 U.S.C. 154(b) by 655 days.

(21) Appl. No.: 17/616,284

(22) PCT Filed: Jun. 17, 2020

(86) PCT No.: PCT/EP2020/066827
§ 371 (c)(1),
(2) Date: Dec. 3, 2021

(87) PCT Pub. No.: WO2020/254446
PCT Pub. Date: Dec. 24, 2020

(65) Prior Publication Data
US 2022/0250094 A1 Aug. 11, 2022

(30) Foreign Application Priority Data
Jun. 17, 2019 (NL) ...................................... 2023332

(51) Int. Cl.
*B04C 3/06* (2006.01)
*B01D 21/00* (2006.01)
(Continued)

(52) U.S. Cl.
CPC ............ *B04C 3/06* (2013.01); *B01D 21/0012* (2013.01); *B01D 21/265* (2013.01);
(Continued)

(58) Field of Classification Search
CPC .............. B01D 21/0012; B01D 21/265; B01D 21/267; B01D 29/114; B01D 29/668;
(Continued)

(56) References Cited

U.S. PATENT DOCUMENTS 3,064,411 A 11/1962 Breslove, Jr.
3,724,669 A 4/1973 Thal
(Continued)

FOREIGN PATENT DOCUMENTS

CA 1139243 A 1/1983
CH 712420 A2 10/2017
(Continued)

OTHER PUBLICATIONS

International Search Report and Written Opinion for PCT/EP2020/066827, mailed Nov. 4, 2020 (12 pages).
(Continued)

*Primary Examiner* — Dirk R Bass
(74) *Attorney, Agent, or Firm* — KDW Firm PLLC

(57) ABSTRACT

A filter device for removing particles from a fluid includes a fluid chamber and an inlet for fluid, an outlet for filtered fluid and an outlet for particles, each coupled to the fluid chamber. The filter device also includes a flow directing mechanism for inducing a vortex flow around a vortex axis in the fluid chamber. The outlet for particles is coupled to the fluid chamber at a location substantially perpendicular to the vortex axis.

18 Claims, 9 Drawing Sheets

(51) Int. Cl.
|  |  |
|---|---|
| *B01D 21/26* | (2006.01) |
| *B01D 29/11* | (2006.01) |
| *B01D 29/66* | (2006.01) |
| *B01D 29/90* | (2006.01) |
| *B04C 9/00* | (2006.01) |

(52) U.S. Cl.
CPC .......... *B01D 29/114* (2013.01); *B01D 29/668* (2013.01); *B01D 29/908* (2013.01); *B04C 2009/004* (2013.01)

(58) Field of Classification Search
CPC .... B01D 29/904; B01D 29/908; B01D 45/16; B04C 2009/004; B04C 3/06
See application file for complete search history.

(56) References Cited

U.S. PATENT DOCUMENTS

| | | | |
|---|---|---|---|
| 6,932,849 | B2 | 8/2005 | Sheidler |
| 7,896,169 | B2 | 3/2011 | Levitt |
| 7,998,250 | B2 | 8/2011 | Pondelick |
| 8,701,896 | B2 | 4/2014 | Levitt |
| 9,238,234 | B2 | 1/2016 | Doujak et al. |
| 2012/0241369 | A1 | 9/2012 | McLane |
| 2012/0292264 | A1 | 11/2012 | Doujak |

FOREIGN PATENT DOCUMENTS

| | | | |
|---|---|---|---|
| CN | 204060865 U | * | 12/2014 |
| DE | 3826454 A1 | | 2/1990 |
| EP | 1499416 B1 | | 9/2007 |
| EP | 2646129 B1 | | 7/2015 |
| EP | 2849864 B1 | | 3/2016 |
| EP | 2788121 B1 | | 6/2016 |
| EP | 2646133 B1 | | 6/2019 |
| FR | 2346039 A1 | | 10/1977 |
| GB | 2397786 B | | 1/2005 |
| GB | 2486910 B | | 5/2014 |
| GB | 2572331 B | | 3/2022 |
| GB | 2597626 B | | 4/2022 |
| GB | 2615842 A | | 8/2023 |
| JP | S6063552 A | | 4/1985 |
| JP | 2014178000 A | | 9/2014 |
| JP | 2017155665 A | | 9/2017 |
| KR | 100868810 B1 | | 11/2008 |
| KR | 20140012133 A | | 1/2014 |
| KR | 20190045852 A | | 5/2019 |
| WO | 9611047 A1 | | 4/1996 |
| WO | 9748646 A1 | | 12/1997 |
| WO | 0185302 A1 | | 11/2001 |
| WO | 2007067073 A1 | | 6/2007 |
| WO | 2013181029 A1 | | 12/2013 |
| WO | 2018154115 A2 | | 8/2018 |
| WO | 2018182579 A1 | | 10/2018 |
| WO | 2020061644 A1 | | 4/2020 |
| WO | 2022018097 A1 | | 1/2022 |
| WO | 2022036383 A1 | | 2/2022 |
| WO | 2023046601 A1 | | 3/2023 |
| WO | 2023078874 A1 | | 5/2023 |

OTHER PUBLICATIONS

WISY AG, "WISY Vortex Fine Filter—WFF100/WFF150 Manual," WISY AG Haustechniksysteme, Filtertechnik, (2009), 8 pages.

* cited by examiner

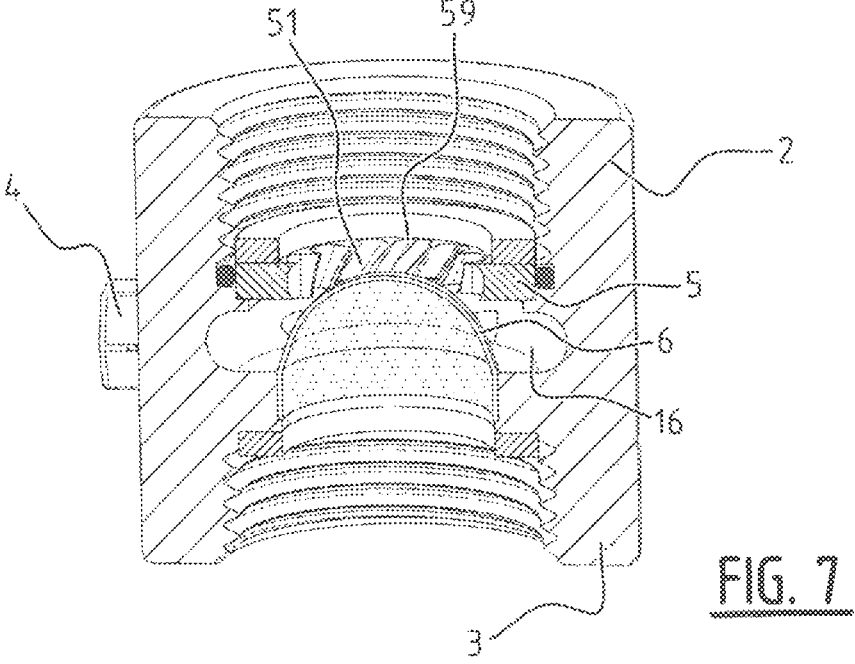
_FIG. 7_
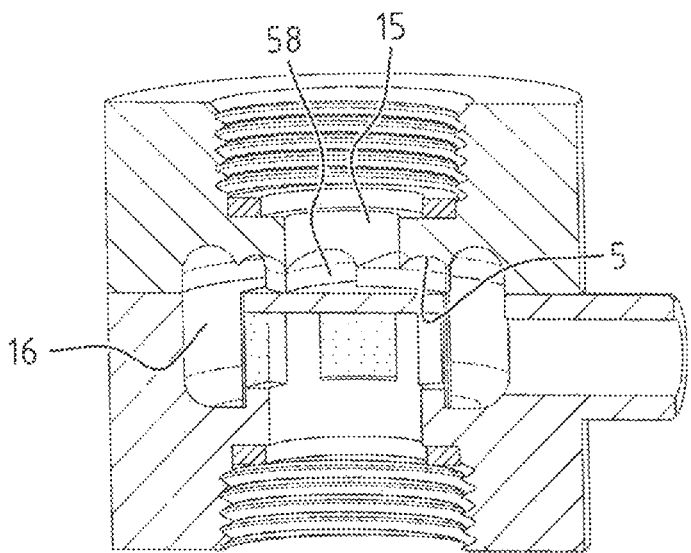
_FIG. 8_

FILTER DEVICE FOR REMOVING PARTICLES FROM A FLUID

This application is a national stage filing under 35 U.S.C. 371 of pending International Application No. PCT/EP2020/0066827, filed Jun. 17, 2020, which claims priority to Netherlands Patent Application No. NL 2023332, filed Jun. 17, 2019, the entirety of which applications are incorporated by reference herein.

The present invention relates to a filter device for removing particles from a fluid, wherein the filter device comprises a fluid chamber and an inlet for fluid, an outlet for filtered fluid and an outlet for particles, each coupled to the fluid chamber, wherein the filter device further comprises a flow directing mechanism for inducing a vortex flow in said fluid chamber.

Such a filter device is known in the form of a hydro cyclone or simply cyclone and is a device to classify, separate or sort particles in a liquid suspension based on the ratio of their centripetal force to fluid resistance. Such a device operates by introducing the fluid to be filtered, i.e. with particles such as sand or dirt, via said fluid inlet into a fluid chamber of the hydro cyclone in such a way as to create a vortex in said fluid chamber. A hydro cyclone will normally have a cylindrical section or chamber at the top, wherein the inlet for fluid is arranged tangentially for inducing a vortex in the chamber. The inlet may thus comprise the above mentioned flow directing mechanism.

The centrifugal acceleration will cause the particles to move away from the central core or rotational axis of the vortex, while the fluid will move towards the central core. Such a hydro cyclone typically has two exits on the axis: one on the bottom (underflow or reject) which functions as outlet for particles and one at the top (overflow or accept) as outlet for filtered fluid.

It is a goal of the present invention, next to other goals, to provide an improved filter for fluids.

This goal, amongst other goals, is met by a method according to appended claim 1. More specifically, in order to meet this goal, amongst other goals, the fluid filter as described above is characterized in that the outlet for particles is coupled to the fluid chamber at a location substantially perpendicular to the vortex axis. The outlet for particles is thus arranged radially outwardly with respect to the vortex axis as induced by the flow directing mechanism. Particles, such as dirt, will thus be urged towards the outlet for particles. This results in an efficient filtering process, which is furthermore not dependent on the orientation of the filter device as a whole, i.e. independent on the direction of gravity. It is noted that with the location of outlet in this context, the location where the outlet debouches in or connects to the fluid chamber is meant.

Due to the flow directing mechanism, or flow directing means, fluid flow from the inlet will at least partially be forced in a vortex flow or cyclone inside the fluid chamber. The flow directing mechanism is arranged to induce such a vortex, wherein the vortex has a predetermined vortex axis. Fluid will flow or revolve around said vortex axis for at least some time. Particles in said flow will be subjected to the centrifugal forces and thus urged outwardly. The centrifugal force is perpendicular to the vortex axis. The outlet for particles is arranged at this location in the fluid chamber, such that particles will be forced towards the outlet. The outlet for particles is preferably arranged at a distance, preferably in the direction of the centrifugal force, from said vortex axis.

Although the outlet is arranged at the radial location as mentioned, the outlet in the form of a conduit may extend in another direction than the radial direction. The outlet conduit may extend under an angle with respect to the radial direction and/or may be arranged eccentrically.

The flow directing mechanism may take any form and is arranged to create a swirling flow or vortex of liquid in the fluid chamber. The mechanism may for instance include a plurality of vanes, which may be arranged tangentially in the fluid chamber. The filter device may further be provided with at least one nozzle introducing the liquid in the fluid chamber with a tangential component. Preferably, a plurality of nozzles is provided, preferably arranged around the fluid chamber for providing a stable vortex. Also the fluid inlet may act as flow directing mechanism.

Preferably, the fluid chamber is substantially cylindrical. This allows an efficient vortex flow inside said chamber. The vortex axis is then preferably parallel to, or more preferably aligned with, the central axis of the cylindrical chamber. The outlet for particles is then preferably arranged at the cylindrical wall, or inner side wall, of the fluid chamber for efficiently receiving the particles.

According to a further preferred embodiment, the fluid chamber has a varying diameter, wherein the outlet for particles is arranged at a location of the fluid chamber with largest diameter. Particles will be urged to the location furthest away from the vortex axis. By providing the outlet for particles at this location, the particles can be collected efficiently. Preferably, the fluid chamber has a varying diameter seen along the central axis of the fluid chamber. Preferably, the diameter is largest near half the length of the central axis and becomes smaller towards the end surfaces thereof. Seen from the bottom to top, the diameter first increases to subsequently decrease.

According to a further preferred embodiment, at least a part of the inner wall of the fluid chamber is provided with a groove. A part of, or preferably a whole, inner circumference of the fluid chamber is then provided with an increased diameter groove. Particles will be collected here. It is then preferred that the outlet for particles is arranged in the groove.

The filter device may be arranged to discharge particles continuously from the outlet for particles. It is however preferred if the outlet for particles is provided with a valve which is movable between an open and a closed position. In closed position, there will be no flow through the outlet. Any particles will accumulate in the flow chamber, for instance at the increased diameter parts or groove. The valve in the outlet may be opened periodically to flush away the particles from the filter device. Opening the valve will result in the particles being flushed through the outlet for particles, in particular if flow of fluid through the fluid outlet is restricted or stopped as will be explained in more detail below. The valve may comprise a turning or a ball valve, which may operate automatically in dependence of the pressure exerted thereon.

According to a further preferred embodiment, the valve is remotely operable and may for instance comprise a solenoid valve. A solenoid valve can be electrically moved, allowing the solenoid valve to be closed and opened from a distance instead of manually. Furthermore, a solenoid valve can be controlled automatically, in particular by a control system.

According to a further preferred embodiment, the filter device comprises a controller for closing and opening the valve. The controller may comprise a timer device. The timing device is thus preferably operably connected to the valve. Due to the timing device, the valve can be closed or opened automatically. For example, the timing device can close and open the valve for a predetermined period of time. In a further example, the timing device can close and open the valve at a predetermined moment in time. The timing device can further close and open the valve at a predetermined interval. This allows automatic flushing of the device.

According to a further preferred embodiment, the filter device comprises a battery system for powering the valve and/or other components. The battery system allows a stand-alone operation of the valve, wherein the operation of the valve comprises the closing and the opening of the valve. Due to the battery system, the filter device can be used without a connection to a power grid. For example, the filter device can be used in areas without a connection to a power grid. In a further example, the filter device can be used during a power outage.

According to a further preferred embodiment, the filter device comprises a photovoltaic or general solar panel system for powering the valve and/or other components. The photovoltaic system allows a stand-alone operation of the valve. Due to the photovoltaic system, the filter device can be used without a connection to a power grid.

According to a further preferred embodiment, the filter device comprises a turbine generator, wherein said turbine generator is arranged for generating electric power from the liquid flow. The turbine generator allows a stand-alone operation of the filter device including the valve and other components. Due to the turbine generator, the filter device can be used without a connection to a power grid. By arranging the turbine generator for generating electric power from the liquid flow, the filter device can be used without the presence of an additional fluid flow such as a river. Furthermore, by arranging the turbine generator for generating electric power from the liquid flow, a compact filter device is achieved.

According to a further preferred embodiment, the turbine generator is located downstream from the outlet for filtered liquid. By locating the turbine generator downstream from the outlet for filtered liquid, the turbine generator can generate electric power from filtered liquid. Generating electric power from filtered liquid increases the lifetime of the turbine generator compared to generating electric power from unfiltered liquid, due to the particles in unfiltered liquid that would damage the turbine. Furthermore, the particles in unfiltered liquid would increase the chance of failure of the turbine. In addition, the particles in unfiltered liquid would decrease the efficiency of the turbine generator.

It is preferred if the outlet for filtered fluid is arranged centrally in the fluid chamber. As the particles will be urged away from the core of the vortex, the inner or core part of the vortex will be substantially free from particles. The fluid in the core, i.e. near or at the vortex axis, can then be discharged if the outlet for fluid is arranged centrally. Preferably, the outlet for filtered fluid is hereto aligned with the vortex axis.

In order to ensure that fluid from the outlet for filtered fluid is free from particles, it is preferred if the device further comprises a sieve. Preferably, the outlet for filtered fluid, for instance at the location were the outlet debouches or connects to the fluid chamber, may be provided with a sieve. Preferably, the sieve is arranged upstream from the outlet for filtered fluid and more preferably downstream of the outlet for particles. Hereby, the particles will primarily be forced to the location furthest away from the vortex axis whereby they can be collected at the inner circumference of the fluid chamber, whereafter they can be flushed from the fluid chamber through the outlet for particles, as is described further below. Particles not collected at this location furthest away from the vortex axis, can still be stopped by the sieve.

Clogging of the sieve is prevented if the sieve has a cylindrical shape. Any accumulating particles in the fluid chamber do then not block passage of the sieve. The sieve is preferably arranged centrally in the fluid chamber. More preferably, the central axes of cylindrical sieve and the cylindrical fluid chamber coincide. The outlet for filtered fluid is preferably arranged inside said cylindrical sieve. The outlet for filtered fluid may then be aligned with the central axes of the sieve and the fluid chamber.

It is noted that the provision of a sieve and in particular the location thereof, may also be applied in a filter device without the outlet for particles being arranged substantially perpendicular to the vortex axis. Other locations may be used for the outlet for particles.

A further preferred embodiment of the fluid filter further comprises an inlet chamber coupled to the inlet, wherein the inlet chamber is delimited from the fluid chamber by a wall member. Fluid is then preferably buffered in the inlet chamber before flowing in the fluid chamber. This ensures that a proper vortex can be formed in the fluid chamber.

It is then preferred that the flow directing mechanism is at least partially formed by a conduit, for instance an opening, between the inlet chamber and the fluid chamber. The conduit may be shaped to direct the flow in a vortex. Thus, the wall member preferably comprises at least one opening being shaped to induce the vortex flow in the fluid chamber.

The wall member may be provided with one opening, for instance shaped obliquely orientated grooves, for inducing, in use, a vortex in the fluid chamber. Additionally or alternatively, the wall member comprises a plurality of nozzles for inducing the vortex flow in the fluid chamber.

Preferably, each nozzle of the plurality of nozzles is arranged to be fed (or supplied) by the inlet chamber, such that each nozzle has a substantially uniform flow with respect to the other nozzles of the plurality of nozzles. This results in a highly stable and powerful vortex, such that the fluid is effectively filtered of the particles. The nozzles may be shaped as openings or conduits in the wall member. The nozzles may also protrude from the wall member in the fluid chamber to create the vortex flow upon introducing liquid through the nozzles. Preferably, the openings or more specifically the nozzles are tangentially oriented for creating a swirling flow or vortex in the fluid chamber. The nozzles or openings are preferably arranged at locations in the wall member at equal mutual distances on a circle. The center of such a circle may then be aligned with the vortex axis.

According to a further preferred embodiment, the inner walls of the nozzles are parallel to the direction of liquid flow. Due to the inner walls of the nozzles being parallel to the direction of liquid flow in the nozzles, clogging of the nozzles is prevented, because particles that are small enough to flow into a nozzle are also small enough to flow out of a nozzle. Preferably, the inner walls of the nozzles are divergent in the direction of liquid flow.

Any wall member may be supported in a housing of the filter device in any known manner. It is preferred if the filter device comprises one housing chamber, which is divided in the inlet chamber and the fluid chamber by the wall member extending there between.

According to a further preferred embodiment, any cylindrical sieve is coaxially arranged between the wall member and the wall of the fluid chamber. The sieve is then securely fastened. It is then preferred if the outlet for filtered fluid is located at that location of the wall of the fluid chamber. Preferably the sieve is arranged around the outlet for filtered fluid. It is then preferred if the sieve abuts the wall member and the wall of the fluid chamber.

According to a further preferred embodiment, the sieve is a filter. While a sieve can separate particles from a liquid at a single perforated layer, a filter can further separate particles from a liquid through a multilayer lattice. For example, the filter can separate micro-plastics from a liquid.

According to a further preferred embodiment, the sieve comprises wire mesh. Preferably, the wire mesh is woven using thread with a round cross section. The sieve may be as fine as 40 μm. If finer sieves are required, a filter may indeed be used, for instance a multilayered filter.

Clogging of the sieve is at least partially prevented.

According to a further preferred embodiment, the housing of the filter device comprises at least two housing parts. Because of the two housing parts, the filter can be easily assembled and installed, for instance for cleaning or replacing parts as will be explained in greater detail below. By providing two housing parts, components of the filter device may be held between these parts such that compact configuration is obtained. The filter components can further be easily secured between the two housing parts.

The filter device preferably has only two housing parts. Alternatively, two outer housing parts may be arranged, wherein other housing components are arranged between the two outer housing parts. The outer housing parts may for instance clamp, using fixation means, the other parts there between.

Preferably, the housing parts are connected using screws or other fixation means. By using screws to connect the housing parts, the housing parts can be tightly secured. This prevents leakage and disintegration of the filter device.

According to a further preferred embodiment, the wall member is secured between the two housing parts. Additional fixating means are then not required. For example, the wall member can be secured at its edges by securing the edges between aligning notches in the two housing parts, wherein two aligned notches form a single notch when the two housing parts abut.

According to a further preferred embodiment, the sieve is secured between a housing part and the wall member. Also for the sieve, no additional fixating means are then required. For example, the sieve can be secured at its edges by securing the edges between a notch or protrusion in a housing part and/or a notch or protrusion in the wall member.

According to a further preferred embodiment, the filter device can be disassembled into the separate housing parts and the wall member. The filter can therefore be easily transported. The filter components can further be easily removed or replaced. For example, additional filter components can further be easily secured between the two housing parts or between a housing part and the wall member.

According to a further preferred embodiment, the sieve is replaceable after or during disassembly of the filter device or components thereof. By having a replaceable sieve, the filter device can be adjusted for different uses. For example, the sieve can be replaced by a filter. The sieve can further be replaced by a different sieve. By having a replaceable sieve, the lifetime of the filter device can be increased. For example, if the sieve is damaged and the filter device therefore no longer functions effectively, the sieve can be replaced. By having a replaceable sieve, the sieve can be removed after or during disassembly. The sieve can then be cleaned or repaired and placed in the filter device during assembly.

Thus, according to a further aspect, a kit of parts is provided comprising a filter device, in particular in the form of two housing parts, and a plurality of sieves, preferably different types of sieves. The user can then assemble the filter device with the desired type of sieve or, in case the same sieves are provided, exchange the sieve when needed.

For the case an inlet chamber is defined, according to a further preferred embodiment, said inlet chamber comprises an inlet sieve for sifting the liquid upstream from the flow directing mechanism or the wall member. By sifting the liquid upstream from the wall member, clogging of the flow directing mechanism or the wall member by particles in the liquid is prevented. Furthermore, sifting the liquid upstream from the wall member limits damage to the wall member by particles flowing past the wall member. Any openings in the wall member are therefore larger than the openings in the inlet sieve. Therefore, the size of the holes through the inlet chamber sieve are at least as small the size of the openings in the wall member, so that any particle that passes through the inlet chamber sieve would surely pass through the wall member to clogging the wall member. For example, the inlet chamber sieve is a mesh. In a different example, the inlet chamber sieve is a perforated plate.

According to a further preferred embodiment, the inlet chamber sieve is supported by the wall member. By supporting the inlet chamber sieve, movement of the inlet chamber sieve when liquid flows through the inlet chamber sieve is prevented. The inlet chamber sieve is preferably supported at least in a direction with at least a component opposite to the direction of liquid flow. The inlet chamber sieve is preferably supported by a protrusion member arranged on the wall member. The protrusion member is arranged for creating a distance between the inlet chamber sieve and the surface of the wall member. A distance between the inlet chamber sieve and the surface of the wall member allows liquid to flow through the entire area of the sieve.

According to a further preferred embodiment, the inlet chamber sieve comprises a plurality of truncated cones. The sieve is then shaped as truncated cones. The truncated tops of the cones preferably extend toward the inlet, i.e. in a direction opposite the fluid flow. Thus, preferably, an opening from an upstream base to a downstream base of a truncated cone is oriented to the direction of liquid flow, wherein the cross section of an opening of a truncated cone preferably diverges in the direction of the liquid flow. The truncated cones are arranged for allowing liquid to flow through the opening through a truncated cone and for blocking particles in the liquid. The cross sections of the truncated cones diverge in the direction of the liquid flow for preventing particles being blocked inside the truncated cones, thereby clogging the sieve.

The upstream truncated top of a cone protrudes preferably upstream for directing blocked particles away from the opening through the truncated cone to prevent clogging of the opening of the truncated cone. Preferably a plurality of cones is provided, such that particles are collected between the cones, near their respective bases.

According to an alternative embodiment, the inlet chamber sieve is shaped as truncated pyramids, wherein an opening from an upstream top to a downstream base of a truncated pyramid is oriented to the direction of liquid flow, wherein the cross sections of the truncated pyramids diverge in the direction of the liquid flow.

According to a further preferred embodiment, the normal of the plane of the upstream top of a truncated cone is at an angle relative to the direction of liquid flow. By arranging the upstream top of a truncated cone or a truncated pyramid to have an orientation with at least a component perpendicular to the direction of liquid flow, particles blocked by the inlet chamber sieve can be directed away from the opening through a truncated cone or a truncated pyramid. Clogging is thus prevented.

Preferably, the inlet chamber sieve comprises a plate like base plate comprising a plurality of truncated cones or pyramids arranged thereon. Passages may be formed by truncating the respective tops of the cones or pyramids. The truncated openings at the top preferably extend under an angle, with respect to the base plate. Specifically, the openings orientated at an angle, for instance 10° or more, with respect to the plane perpendicular to the flow direction.

According to a further preferred embodiment, the sieve is made by punching. The cones or pyramids may be formed by punching the respective shapes in a plate like element.

According to a further preferred embodiment, the sieve is made by injection molding.

According to a further preferred embodiment, the inlet chamber comprises an outlet for particles blocked by the inlet chamber sieve. Because of the outlet for blocked particles, particles blocked by the inlet chamber sieve can be removed from the inlet chamber. Removing blocked particles from the inlet chamber prevents clogging of the inlet chamber or the inlet chamber sieve. The outlet preferably has a component perpendicular to the direction of liquid flow. The outlet for blocked particles is arranged in particular for particles blocked by the inlet chamber sieve and directed away from the holes through the inlet chamber sieve in a direction with a component perpendicular to the direction of liquid flow. Preferably, the outlet for blocked particles is arranged eccentrically relative to a central axis of the liquid flow for a more optimal receiving of the blocked particles by the outlet for blocked particles.

According to a further preferred embodiment, the filter device comprises a blocked particle outlet valve. This valve is preferably movable between an open and closed position and is preferably arranged to block any axial flow through the outlet for blocked particles in a closed position. The blocked particle outlet valve can prevent liquid from entering the blocked particle outlet during filtering of the liquid so that all liquid can be filtered and flow through the outlet for filtered liquid.

According to a further preferred embodiment, the inlet chamber further comprises a second inlet for flushing the blocked particles from the inlet chamber, preferably to an outlet for blocked particles. Because of the second inlet, a fluid can be introduced for flushing the blocked particle from the inlet chamber to the outlet for blocked particles to prevent clogging of the inlet chamber or the inlet chamber sieve. In particular the particles that are prevented by the liquid flow from being directed to the outlet for blocked particles can be flushed by the fluid introduced by the second inlet. Further, the particles that are prevented by the inlet chamber sieve from being directed to the outlet for blocked particles can be flushed by the fluid introduced by the second inlet.

For example, particles can get between truncated cones or truncated pyramids and can be directed to the outlet for blocked particles when directed by a fluid from the second inlet. The second inlet preferably has a component perpendicular to the direction of liquid flow. By having a component substantially perpendicular to the direction of liquid flow, the second inlet is arranged in particular for introducing a fluid for particles blocked by the inlet chamber sieve and directed away from the holes through the inlet chamber sieve in a direction with a component perpendicular to the direction of liquid flow. Preferably, the second inlet is arranged eccentrically relative to a central axis of the liquid flow for having a stream throughout a substantial part of the inlet chamber during the flushing of the inlet chamber.

According to a further preferred embodiment, the filter device comprises a second inlet valve arranged to block any axial flow through the second inlet in a closed position. The second inlet valve can prevent liquid from entering the second inlet during filtering of the liquid so that all liquid can be filtered and flow through the outlet for filtered liquid.

According to a further embodiment, a pump is arranged upstream from the second inlet for introducing a fluid into the inlet chamber for the flushing. This pump and inlet can also be used to flush any particles from the fluid chamber using the outlet for particles.

According to a further preferred embodiment, the filter device comprises an inlet valve arranged to block any axial flow through the inlet for liquid in a closed position. The inlet valve can prevent fluid and blocked particles from entering the inlet during flushing of the inlet chamber so that all blocked particles can be flushed and collected by the outlet for blocked particles.

According to a further preferred embodiment, the filter device comprises an outlet valve arranged to block any axial flow through the outlet for filtered liquid in a closed position. The outlet valve can prevent fluid and particles from entering the outlet during flushing of the fluid chamber so that all particles can be flushed and collected by the outlet for particles.

According to a further preferred embodiment, a pump is arranged downstream of the outlet for liquid. The pump can be operated to create a liquid flow through the filter device. The pump can further create a flow through the filter device that enables the filter device to filter the liquid. The outlet valve may then be arranged between the filter and the pump.

According to a further preferred embodiment, a hydrophore system is arranged downstream of the outlet for liquid. Preferably, the hydrophore system comprises an expansion vessel. Preferably, the pump provides the pressure for the hydrophore system.

According to a further preferred embodiment, the hydrophore system is arranged to provide a pressure to the inlet chamber via the second inlet. A conduit may be provided. Because the hydrophore system can provide a flow through the inlet chamber, the hydrophore system can be used for flushing the filter device. For example, if the filter device is clogged and the downstream pump cannot provide a flow through the filter device, the hydrophore can provide a fluid flow through the filter device for flushing the filter device.

According to a further preferred embodiment, the filter device comprises a controller. Preferably, the controller is arranged for controlling the pump and/or other components. Controlling the pump can prevent pumping by the pump when the filter device is too clogged. For example, the controller is arranged to send an input signal to the pump. The input signal may be based on a pressure in the fluid chamber. For example, the pump is controlled to turn off when the pressure in the fluid chamber is below a threshold.

According to a further preferred embodiment, the controller is arranged to control the hydrophore system in providing pressure to the inlet chamber.

According to a further preferred embodiment, the controller is arranged to control any valve. For example, the controller can control the valve for the outlet for particles, the inlet valve, the outlet valve, the second inlet valve and/or the valve for the outlet for blocked particles. By controlling any of the valves, the valves can be controlled accordingly during the filtering of the liquid so that liquid flows only through the inlet and filtered liquid flows only through the outlet. Furthermore, the valves can be controlled accordingly during the flushing of the filter device. For example, blocked particles are prevented from flowing through the inlet.

It will be appreciated that the concepts of the valves and the other components of the filter device may be used in a filter device without a inlet chamber defined by the wall member.

A compact filter device is obtained, which can be efficiently inserted in a fluid piping system, when the outlet for filtered fluid is aligned with the inlet for fluid. Such a fluid piping system can for instance be a water piping system, a fuel piping system for liquid fuels, such as petrol, diesel, kerosene, bio-based fuels, and/or the like. The filter device can for instance be arranged at piping system of a fuel station and/or fuel supply system, such that particles in the main fuel supply are filtered out and do not end up in the fuel tank of a vehicle and/or the motor of the vehicle where they could cause damage and/or wear.

The filter device can be manufactured efficiently and compact. The filter device is thus suitable to be used in a fluid piping system. The filter device may for instance be arranged at an entrance of the (water) piping system in a building or house to prevent any dirt particles, such as sand, from entering the water piping system in such a building to prevent damage of any other components. According to a further aspect, a fluid piping system provided with a filter device, or a building provided with such a fluid piping system is thus provided.

Another aspect relates to a method for filtering a fluid using a filter device as described above, wherein the method comprises introducing a fluid in the fluid inlet, filtering said fluid and providing filtered fluid from the outlet for fluid.

The method preferably further comprises the step of flushing the filter device including:

opening a valve provided in the outlet for particles from a closed position to an open position during a predetermined period of time;

collecting the particles from the outlet for particles, and;

moving the valve to the closed position.

The particles collected in the fluid chamber will then efficiently be removed from the fluid chamber via the outlet for particles. The particles will be flushed out by introducing liquid via the liquid inlet. The flow for flushing out particles can be generated by, for instance, a pump arranged upstream of the filter for pushing the fluid flow through the filter, a suction pump arranged on the outlet for particles downstream of the filter, a suction pump arranged downstream of the outlet for fluid and/or a manually operable pump for generating a fluid flow, and thereby the vortex, through the filter.

To promote flow from the inlet to outlet for particles, it is then preferred if the method further comprises the step of limiting the flow at the outlet for fluid. The fluid flow at the outlet for fluid may for instance be blocked. This can be achieved by a valve or for instance by closing all the water taps downstream, for instance in a building such as a house.

The method for filtering a fluid using a filter device as described above preferably further comprises the step of flushing the inlet chamber including:

introducing a fluid into the inlet chamber through the second inlet, and;

collecting the blocked particles from the inlet chamber through the outlet for blocked particles.

The particles blocked by the inlet chamber sieve will then efficiently be removed from the inlet chamber via the outlet for blocked particles. The particles will be flushed out by introducing fluid via the second inlet. The flow for flushing out blocked particles can be generated by, for instance, a pump arranged upstream of the filter for pushing the fluid flow through the inlet chamber, a suction pump arranged on the outlet for blocked particles and/or a manually operable pump for generating a fluid flow through the inlet chamber.

The method for flushing the inlet chamber, for which the controller may be arranged, further comprises the sequential steps of operating the valves including:

opening the blocked particle outlet valve;

opening the second inlet valve;

closing the second inlet valve after flushing, closing the blocked particle outlet valve.

During flushing, the inlet valve may be closed to be opened after flushing.

Blocked particles are then prevented from flowing through the inlet for liquid. After flushing the inlet chamber, the valves can be operated for the filtering of the liquid so that liquid flows only through the inlet and filtered liquid flows only through the outlet for filtered liquid. A pump be provided at the second inlet which may be operated to provide liquid to the second inlet when flushing.

The method for filtering a fluid using a filter device preferably further comprises the step of flushing the fluid chamber including:

introducing a fluid into the inlet chamber through the second inlet, and;

collecting the particles from the fluid chamber through the outlet for particles.

Particles in the fluid chamber are then efficiently removed from the fluid chamber via the outlet for particles. The particles will be flushed out by introducing fluid via the second inlet. The flow for flushing out particles can be generated by, for instance, a pump arranged upstream of the filter for pushing the fluid flow through the fluid chamber, a suction pump arranged on the outlet for particles and/or a manually operable pump for generating a fluid flow through the fluid chamber.

The method for flushing the fluid chamber, for which the controller may be arranged, further comprises the step of operating the valves including:

having the blocked particle outlet valve in a closed position;

opening the valve provided in the outlet for particles;

opening the second inlet valve;

closing the second inlet valve after flushing, closing the valve provided in the outlet for particles.

Prior to and after flushing, the inlet and outlet valve may be closed to be opened thereafter.

Fluid for flushing the fluid chamber is then prevented from flowing through the inlet for liquid, the second inlet and/or the outlet for filtered liquid. After flushing the fluid chamber, the valves can be operated for the filtering of the liquid so that liquid flows only through the inlet and filtered liquid flows only through the outlet for filtered liquid.

The method for filtering a fluid using a filter device as described above preferably further comprises the step of timing the closing and opening of the valve including:

providing a timing device for providing a time setting for closing and opening the valve for a predetermined period of time, and;

providing a signal for closing or opening the valve based on the time setting.

The particles collected in the fluid chamber will then automatically be removed from the fluid chamber via the outlet for particles. The timing of the closing and opening of the valve can be controlled by the timing device.

The present invention is further illustrated by the following Figures, which show preferred embodiments of the filter device, and are not intended to limit the scope of the invention in any way, wherein.

Figures 3, 4:
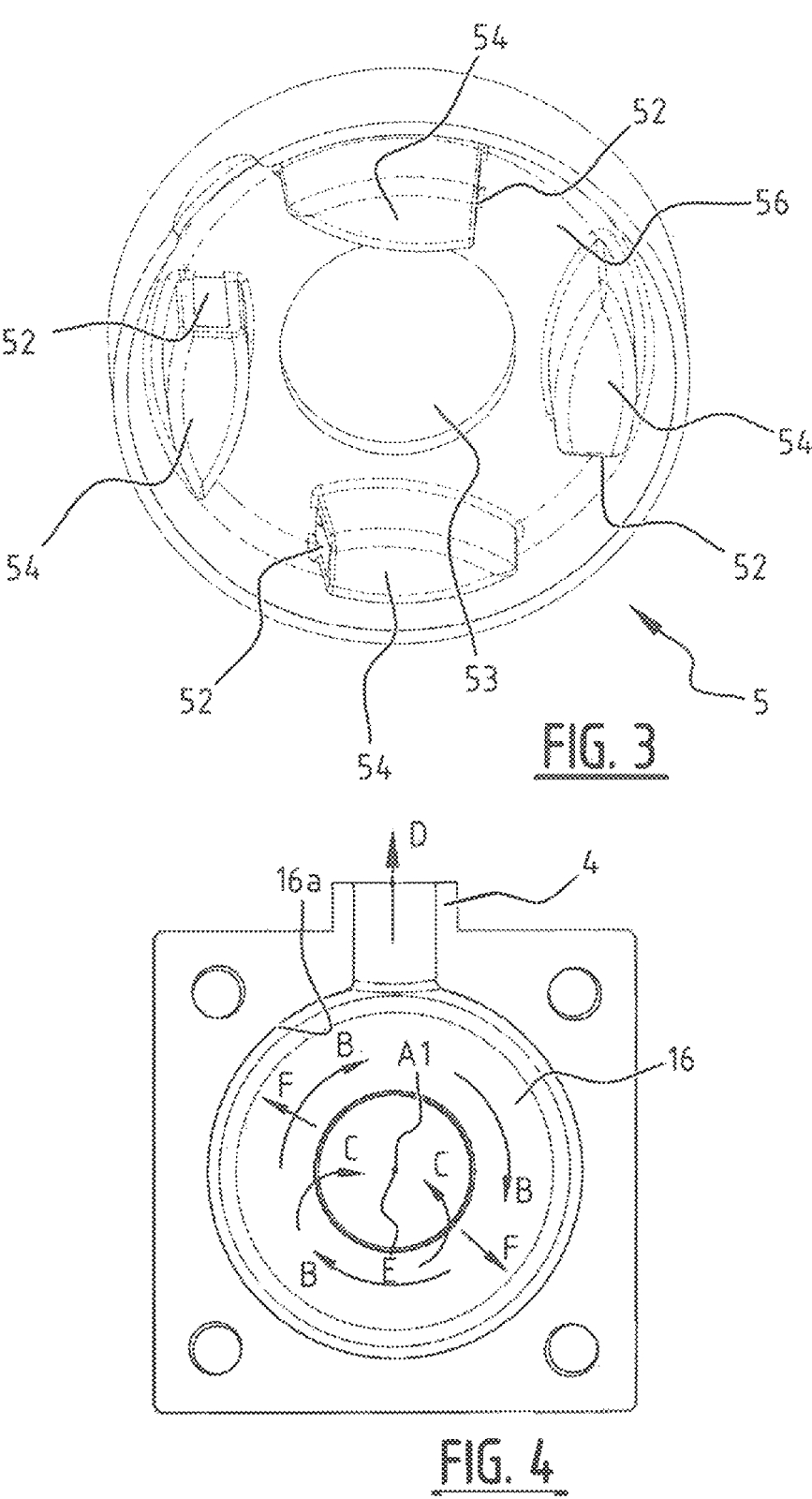
FIG. 3 shows an example of a flow directing mechanism.
Figure 9:
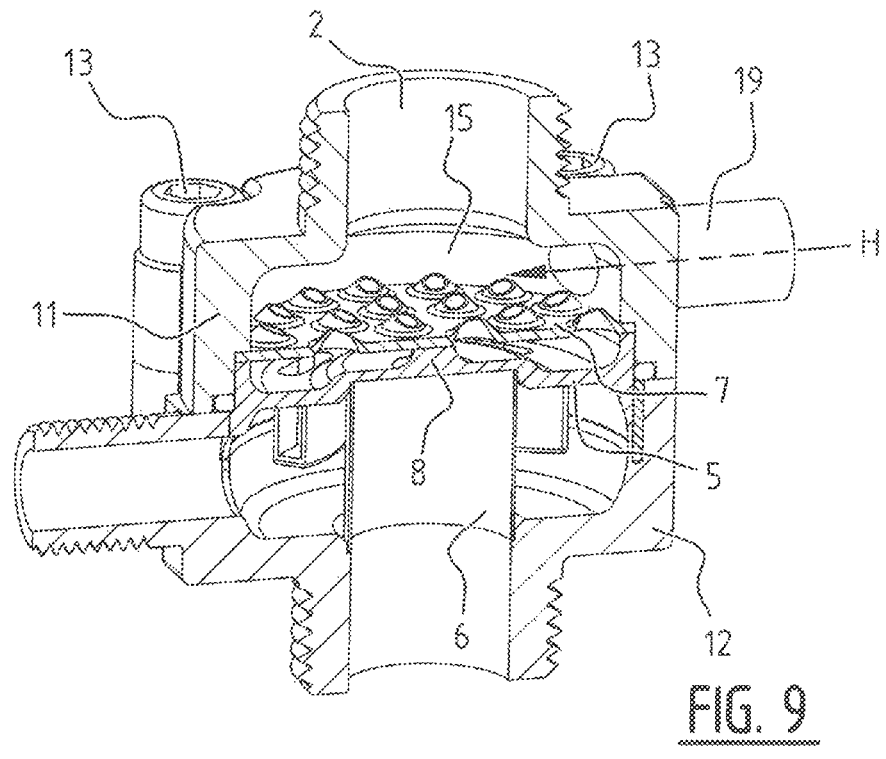
Figure 10:
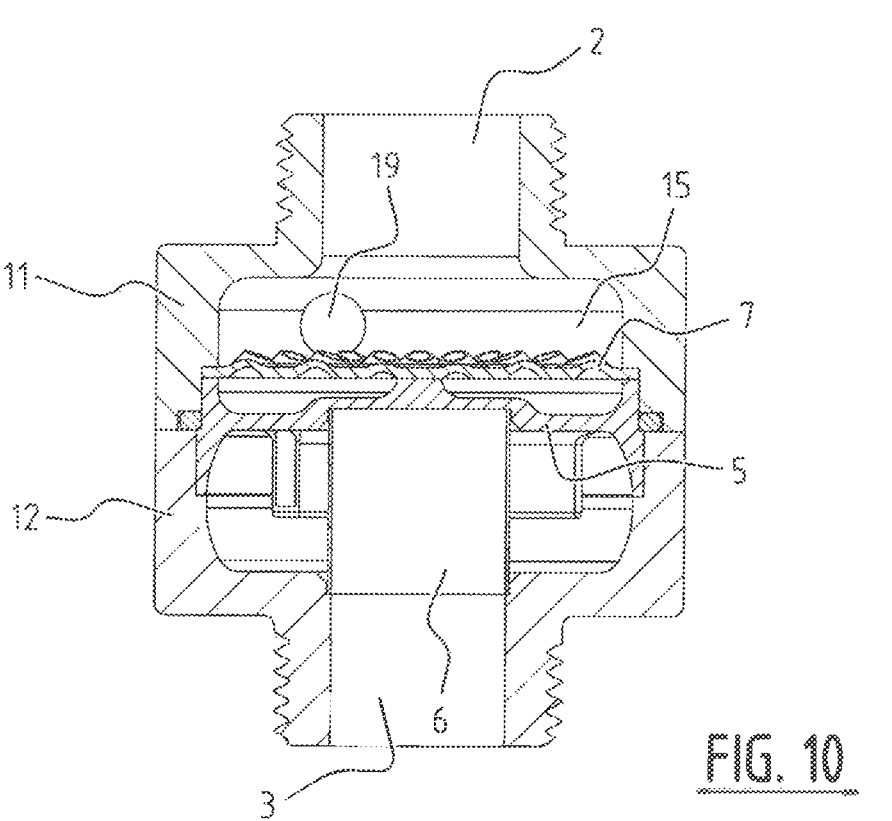
Figures 11, 12:
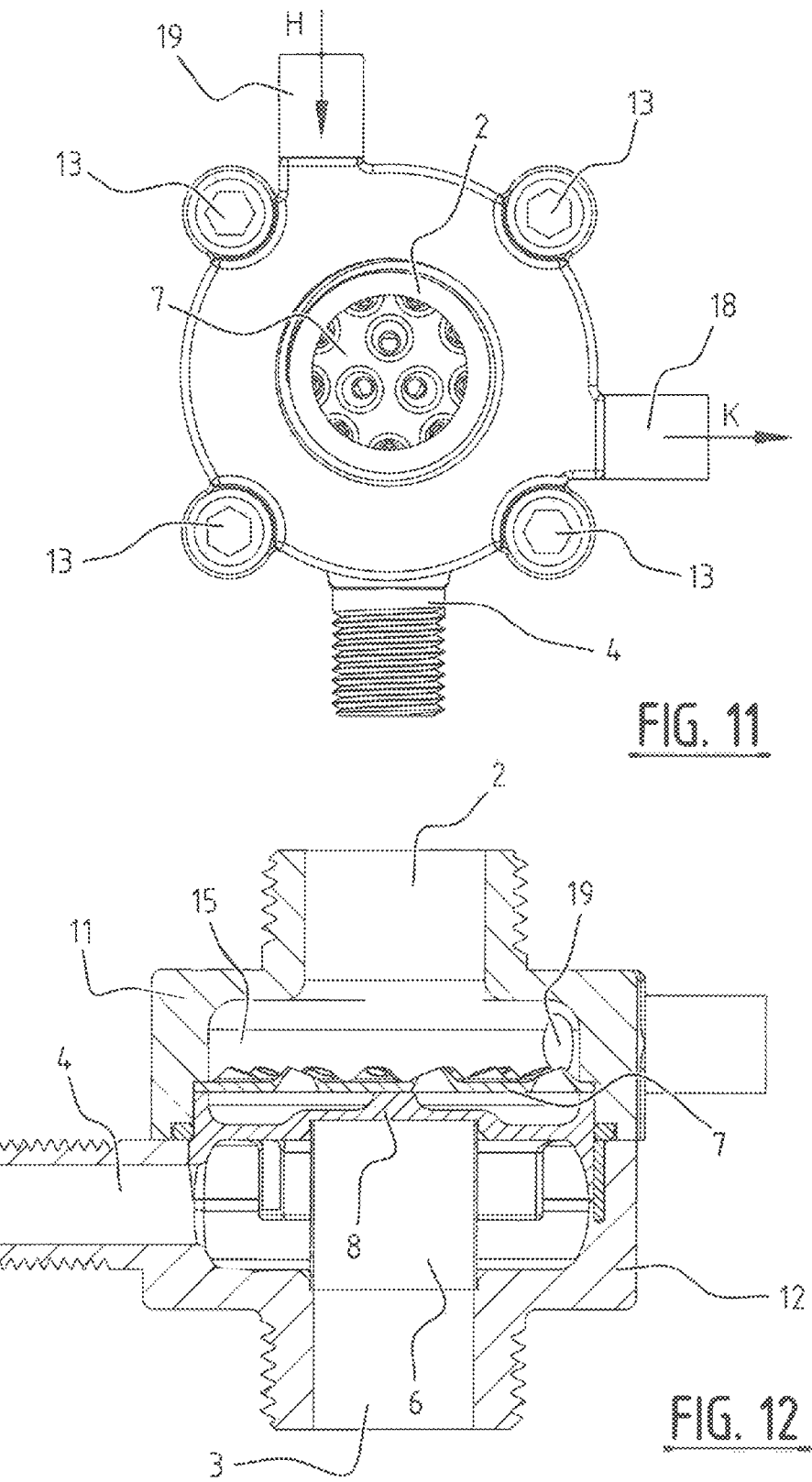
Figure 13:
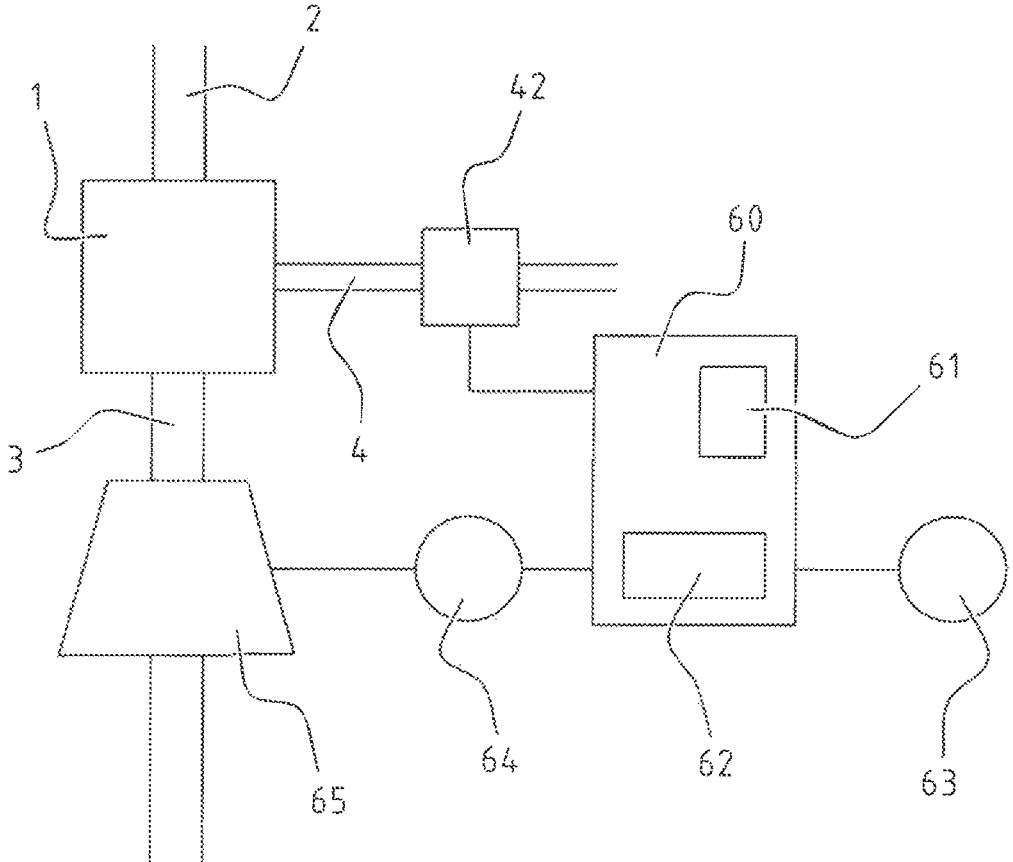
Figures 14, 15:
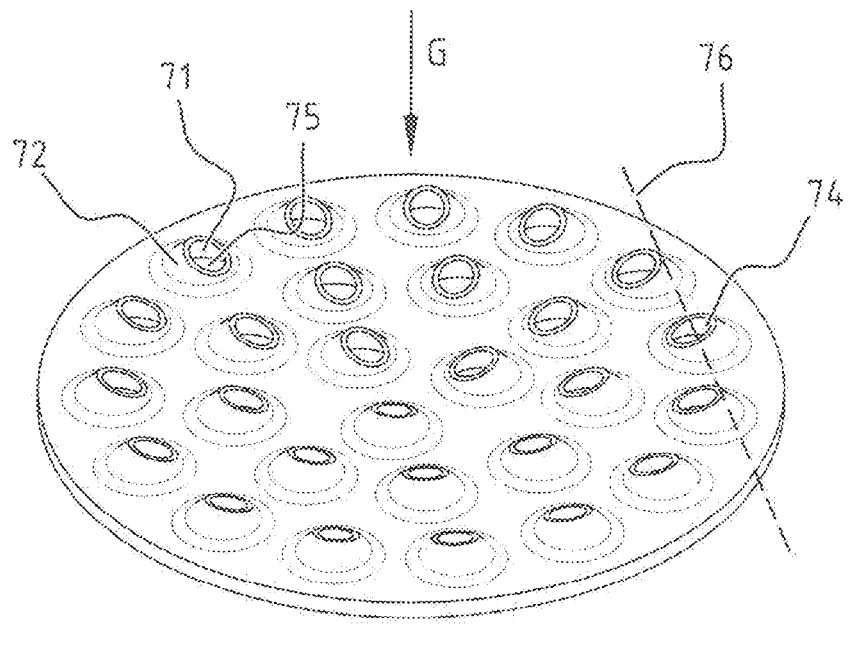

FIG. 4 schematically shows the working principle of the filter device;

FIGS. 5-9 show different embodiments of the filter device;

FIG. 10 shows a cross section of the filter device of FIG. 9;

FIG. 11 shows a top view of the filter device of FIG. 9;

FIG. 12 shows a different cross section of the filter device of FIG. 9;

FIG. 13 shows a system for operating the valve;

FIG. 14 shows holes in the inlet chamber sieve in an embodiment of the filter device;

FIG. 15 shows a cross section of the inlet chamber sieve of FIG. 14.

Figure 16:
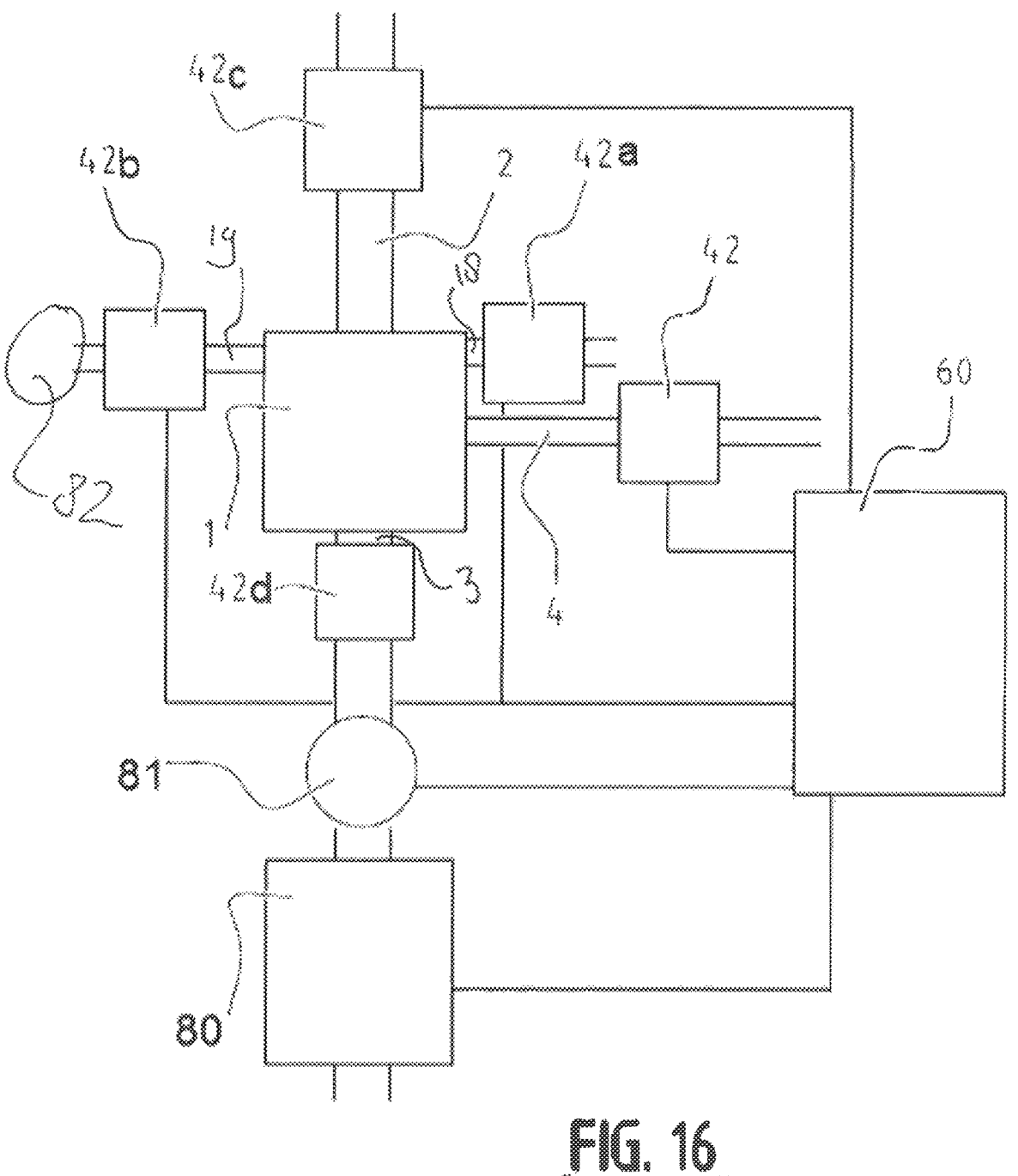

FIG. 16 shows a system for controlling a pump, a hydrophore system and valves.

Figure 1:
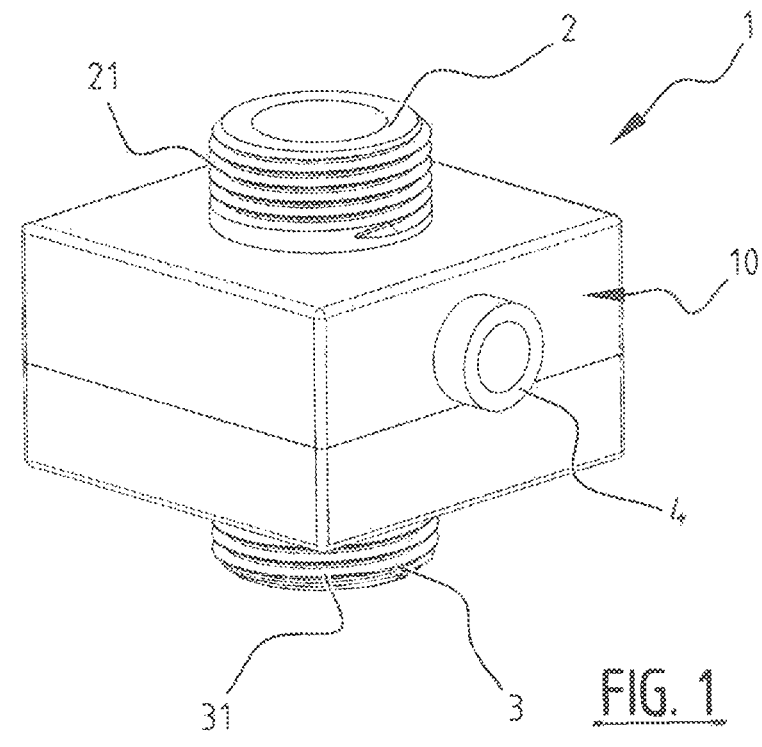
FIG. 1 shows the filter device in perspective view.
Figure 2:
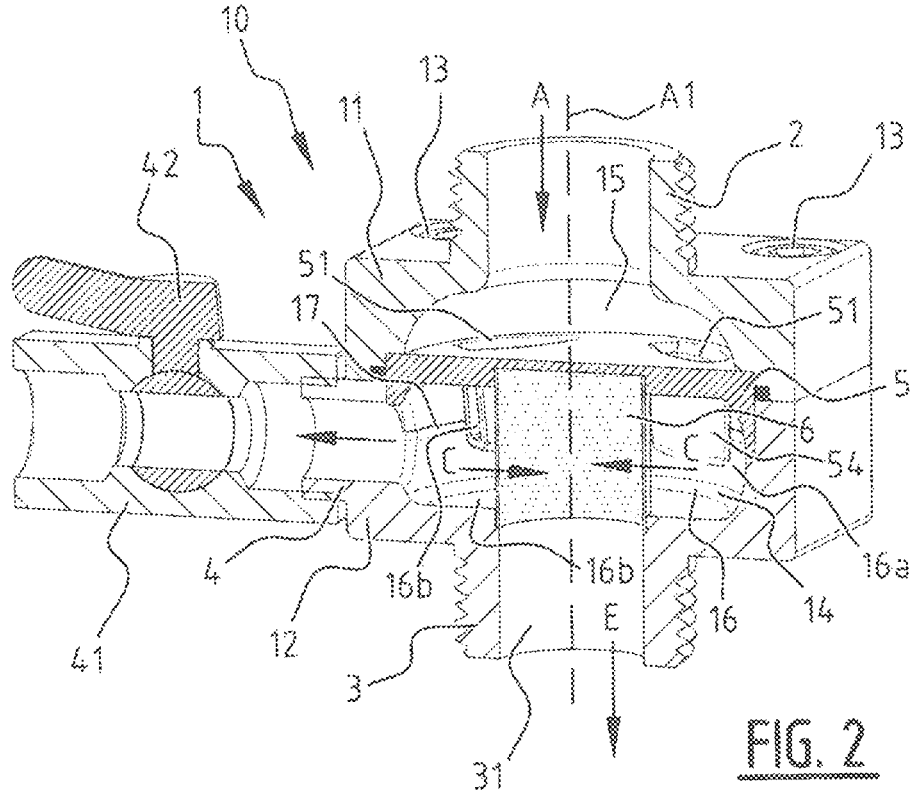
FIG. 2 shows a cross section of the filter device of FIG. 1.

With reference to FIG. 1, a filter device or simply filter 1 is shown which comprises a housing 10. The filter 1 further comprises an inlet 2 for fluid, an outlet for fluid 3 and an outlet 4 for particles, such as dirt and sand. Inlet 2 and outlet 3 are aligned and also provided with threading 21 and 31, which allows efficient coupling of the filter 1 in a water piping system. In FIG. 2, the outlet 3 is shown to be provided with internal threading 31 as an alternative.

Again with reference to FIG. 2, it can be seen that in this example the housing 10 comprises two housing parts 11 and 12, which are connected using screws 13 in this example. Inside the housing, a housing chamber 14 is defined, to which the inlet 2 and the outlets 3 and 4 and connected. Each of the inlets 2 and outlets 3 and 4 debouche in the housing chamber 14.

Provided in the housing chamber 14 is a wall member 5, which is shown in isolation in FIG. 3, which divides the housing chamber 14 in an inlet chamber 15 connecting to the inlet 2 and a fluid chamber 16 into to which the outlets 3 and 4 connect. Inlet chamber 15 functions as buffer for liquid.

In the wall member 5, openings 51 are provided at regular intervals on a circle which form nozzles 54. Nozzles 54 have openings 52 which are oriented tangentially around a central axis A1 (see FIG. 4) of the flow chamber 16. Liquid coming into the inlet chamber 15, indicated with the arrow A in FIG. 2, will flow into openings 51 and exit nozzles 54 via openings 52 into the fluid chamber 16. A vortex, indicated with the arrows B in FIG. 4, will thus be created in the fluid chamber 16. The wall member 5 with the openings 51 and 52 are thus arranged to induce a vortex of liquid in the fluid chamber 16. The fluid will revolve around a vortex axis, which coincides with the central axis A1 of the fluid chamber 16.

The outlet 4 for particles is arranged at a location perpendicular to and away from the vortex axis A1, which is best seen in FIGS. 2 and 4. Through the centrifugal forces, particles will be urged away from the vortex axis A1 towards the inner side wall 16a of the fluid chamber 16. This is schematically indicated with the arrows F in FIG. 4. The outlet 4 is arranged in this inner side wall 16a, at least, the outlet 4 debouches in the fluid chamber 16 at the inner side wall 16a.

As the particles move outwardly, particle free liquid will move inwardly, indicated with arrows C in FIGS. 2 and 4 and are allowed to flow into the outlet 3 for filtered fluid. To ensure that no liquid will flow into the outlet 3, a sieve 6 is provided. Sieve 6 is arranged between lower wall 16b of the fluid chamber 16 and the lower wall 5b (see FIG. 3) of the wall member 5, which is thereto provided with a recess 53 in this example. The outlet 3 is arranged inside the cylindrical sieve 6.

In particular in FIG. 2 it is visible that although the fluid chamber 16 is substantially cylindrical, the diameter of chamber 16 varies over the axis A1. The chamber 16 broader, i.e. the inner side wall 16a is further away from the central axis A1, in the middle thereof, seen in the height direction in this figure. Particles will accumulate at this region. The inner side wall 16a is further provided with a groove 17, wherein the outlet 4 is arranged at the location of the groove 17.

The outlet 4 is connected to a pipe element 41 which is provided with a valve 42. This allows outlet 4 to be opened and closed. In closed position, there is no flow through the outlet, at least not through the pipe 41. Any particles in the fluid will this accumulate at the perimeter of the fluid chamber 16. As the outlet 4 is arranged at this perimeter, when the valve is opened, liquid will entrain any particles accumulated in the fluid chamber 16 and flush the particles through the outlet 4. The fluid chamber 16 can thus be flushed efficiently.

Figure 5:
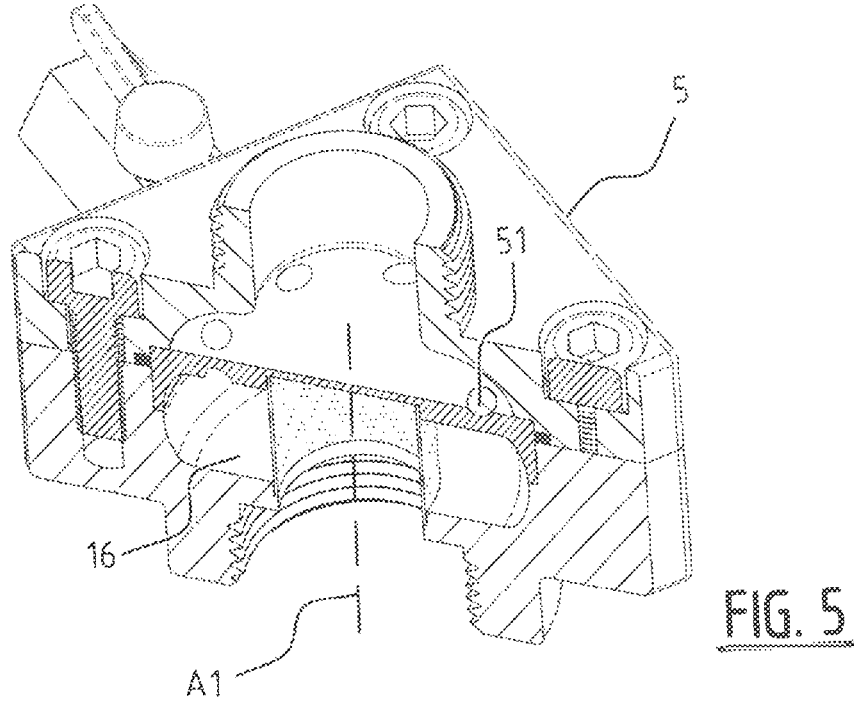
Figure 6:
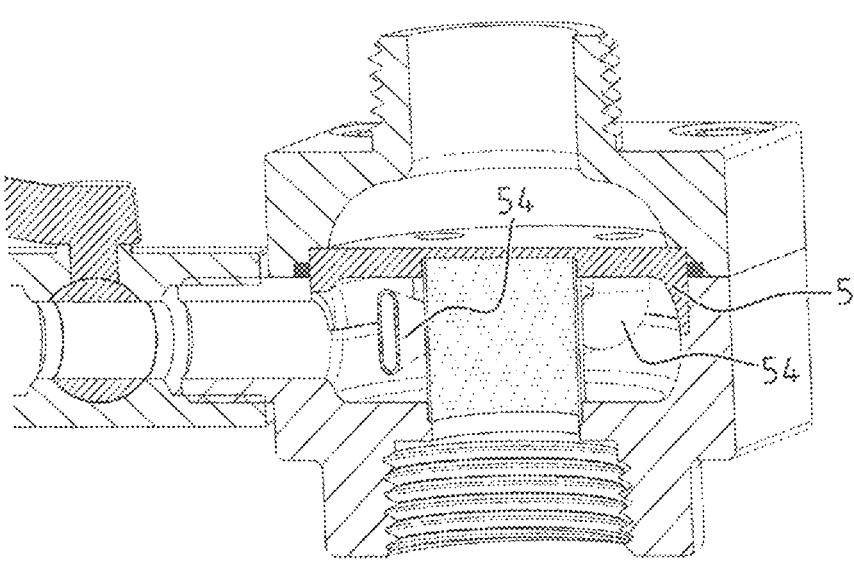

In FIG. 5, an alternative for the wall member 5 is shown, wherein the flow directing mechanism for inducing a vortex in the fluid chamber 16 comprises a plurality of conduits 51 through the wall member 5. The conduits 51 are oriented tangentially around the central axis A1 for generating a vortex around said central axis A1. FIG. 6 shows another example, wherein the flow directing mechanism 5 is in the form of nozzles 54.

In the example of FIG. 7, the flow is directed in a vortex in the fluid chamber 16 by a central opening 51 which is provided with tangentially oriented grooves 59 for redirecting the flow. It is further visible that the inlet chamber is very small and may even be formed by the inlet 2 itself. In this example, the sieve 6 is dome shaped, but still arranged round the outlet 3. In the embodiment of FIG. 8, the flow directing means 5 are formed between inlet chamber 15 and the fluid chamber 16 directs the liquid radially outwardly in a swirl using obliquely oriented channels 58.

In the embodiment of FIGS. 9-12, the wall member 5 is secured between the two housing parts 11 and 12, wherein a inlet chamber 15 is defined upstream of the wall member 5. In the inlet chamber 15, an inlet chamber sieve 7 is provided and is in this example secured between housing part 11 and the wall member 5. The wall member 5 is further arranged to support the inlet chamber sieve 7 by a protrusion member 8. The inlet chamber sieve 7 is arranged to filter any larger particles from the fluid and prevents clogging of the openings 51 in the wall member 5 and the inlet chamber sieve 7 is arranged to block particles in the liquid downstream from the inlet 2.

In FIG. 14, an example of the inlet chamber sieve 7 is shown in greater detail, whereas FIG. 15 shows a cross-section of the sieve 7. The direction of liquid flow through the inlet chamber sieve 7 is indicated by the arrow G, which corresponds to the longitudinal direction of the filter device extending between the inlet and outlet. The inlet chamber sieve 7 has protrusions shaped like truncated cones 72, wherein a hole of the inlet chamber sieve 7 is formed by an opening 71 from the upstream top 74 of a truncated cone to the downstream base 75 of the truncated cone, wherein the cross section of the opening 71 diverges in the direction of liquid flow. In FIG. 15, a cross section of the inlet chamber sieve 7 of FIG. 14 is shown. The inner walls 73 of an opening 71 through a truncated cone 72 diverge in the direction of liquid flow. FIG. 14 further shows that the normal 76 of the plane of the upstream base 74 of a truncated cone is at an angle relative to the direction of liquid flow. Particles will then not block the openings and will pass to the locations between the truncated cones 72.

In order to flush away any particles remaining on the sieve 7 or generally from the filter device 1, for instance the wall member 5, an outlet for blocked particles 18 is connected to the inlet chamber 15, see in particular FIG. 11. This outlet may be provided with a valve and when opened, particles may be flushed away through the outlet 18. Fluid for flushing the outlet 18 may come from the inlet 2. It is however also possible to provide a second inlet for fluid 19 which is connected to the inlet chamber 15. The flow of fluid from the second inlet 19 is indicated by the arrow H in FIGS. 9 and 11. Fluid for flushing the inlet chamber 15 is introduced by the second inlet 19 as indicated by the arrow H. The outlet for blocked particles 18 is arranged to collect the fluid with the particles blocked by the inlet chamber sieve 7, as indicated by the arrow K.

The inlet 19 may also be used to flush the fluid chamber 16. Flushing is then possible without supply of liquid from the inlet 2. A pump or other fluid source may for instance be coupled to the second inlet 19.

In FIG. 13, the filter device 1 with a valve 42 for flushing particles in the outlet for particles 4 is schematically shown. The valve 42 is arranged to receive a signal from a control module 60 for closing or opening the valve 42. In this example, the control module 60 comprises a timing device 61 for providing a signal for closing or opening the valve 42 for a certain amount of time. The control module 60 further comprises a battery system 62 for powering the valve 42. FIG. 13 further shows a photovoltaic system 63 for powering the valve 42 and/or for charging the battery system 62. FIG. 13 further shows a turbine 65 connected to the outlet for filtered fluid 3 downstream from the filter device 1. A generator 64 is arranged to power the valve 42 and/or charge the battery system 62 using the flow of liquid through the turbine 65.

In FIG. 16, the filter device 1 is provided upstream from a pump 81. The pump 81 may be operably connected with the control module 60 for controlling a pump 81. A hydrophore system 80 is further provided. The valve 42 for flushing particles in the outlet for particles 4 is again schematically shown. Also shown are valve 42a associated with the blocked particles outlet 18 and the second inlet valve 42b associated with second inlet 19. Also shown is a valve 42c for the inlet 2 and a valve 42d associated with the outlet 3. The valve 42d is arranged between the outlet 3 and the pump 81.

The valve 42, the valve 42a, the inlet valve 42c and the outlet valve 42d are arranged to receive a signal from the control module 60 for closing and opening the respective valves. The pump 81 is arranged to receive a signal from the control module 60 for creating a flow of liquid through the filter device 1. In the hydrophore system 80 a liquid pressure can be maintained by the pump 81. The control module 60 is arranged to measure the pressure inside the filter device 1. In this example, a second pump 82 is shown to provide fluid for flushing the filter 1. The second inlet 19 may however also be coupled to the hydrophore system 80 or other pressure system.

The control module 60 is further arranged to be able to send a signal to the pump 81 to turn off, alternatively, a signal may be provided to the controller 60 which indicates that the pump is off. The control module 60 may further be arranged to control the hydrophore system 80. The control module may further be arranged to open the second inlet valve 42b for flushing at least a part of the filter device 1, for instance when the pump 81 is off. The pump 82 and/or the hydrophore system 80 may be arranged to then provide a fluid flow through the second inlet 19.

The control module may be arranged to open the blocked particles valve 42a in the outlet for blocked particles 18. A fluid flow for flushing the inlet chamber 15 then flushes the blocked particles out via the outlet for blocked particles 18. The valve 42, and preferably also valve 42d may then be closed for urging the fluid through outlet 18. The control module 60 may also be arranged to close the inlet valve 42c to prevent blocked particles from entering the inlet for liquid 2. The control module 60 may further be arranged to close the outlet valve 42d in the outlet for filtered liquid 3 to prevent fluid for flushing at least part of the filter device 1 to enter the outlet for filtered liquid 3.

After flushing, the control module 60 may further be arranged to close the blocked particles valve 42a to prevent fluid for flushing the fluid chamber 16 from entering the outlet for blocked particles 18. In a next step, the fluid chamber 16 may then be flushed by opening valve 42, for instance also using fluid from the inlet 19. Alternatively, valves 42a and 42 are opened at the same time or valve 42 is opened prior to valve 42a, wherein valve 42a may be opened after valve 42 is closed.

The present invention is further illustrated by the following embodiments, which are not intended to limit the scope of the invention in any way:

1. Filter device for removing particles from a fluid, wherein the filter device comprises a fluid chamber and an inlet for fluid, an outlet for filtered fluid and an outlet for particles, each coupled to the fluid chamber, wherein the filter device further comprises a flow directing mechanism for inducing a vortex flow around a vortex axis in said fluid chamber, characterized in that the outlet for particles is coupled to the fluid chamber at a location substantially perpendicular to the vortex axis.
2. Filter device according to embodiment 1, wherein the fluid chamber is substantially cylindrical and wherein the outlet for particles is arranged at the cylindrical wall.
3. Filter according to embodiment 1 or 2, wherein the fluid chamber has a varying diameter, wherein the outlet for particles is arranged at a location of the fluid chamber with largest diameter.
4. Filter according to embodiment 1, 2 or 3, wherein at least a part of the inner wall of the fluid chamber is provided with a groove, wherein the outlet for particles is arranged in the groove.
5. Filter device according to any of the preceding embodiments, wherein the outlet for particles is provided with a valve which movable between an open and a closed position.
6. Filter device according to any of the preceding embodiments, wherein the outlet for fluid is aligned with the vortex axis.

7. Filter device according to any of the preceding embodiments, further comprising a sieve, wherein the sieve is arranged upstream from the outlet for filtered fluid.

8. Filter device according to embodiment 7, wherein the sieve has a cylindrical shape.

9. Filter device according to any of the preceding embodiments, further comprising an inlet chamber coupled to the inlet, wherein the inlet chamber is delimited from the fluid chamber by a wall member, wherein the wall member comprises at least one opening being shaped to induce the vortex flow in the fluid chamber.

10. Filter device according to embodiment 9, wherein the wall member comprises a plurality of tangentially oriented nozzles for inducing the vortex flow in the fluid chamber.

11. Filter device according to at least embodiments 8 and 9, wherein the cylindrical sieve is coaxially arranged around the outlet for filtered fluid between the wall member and the wall of the fluid chamber.

12. Filter device according to any of the preceding embodiments, wherein the outlet for filtered fluid is aligned with the inlet for fluid.

13. Fluid piping system provided with a filter device according to any of the preceding embodiments.

14. Method for filtering a fluid using a filter device according to any of the preceding embodiments, wherein the method comprises introducing a fluid in the fluid inlet, filtering said fluid and providing filtered fluid from the outlet for fluid.

15. Method according to embodiment 14, further comprising the step of flushing the filter device including:
limiting the flow at the outlet for fluid;
opening the a valve provided in the outlet for particles from a closed position to the an open position during a predetermined period of time;
collecting the particles from the outlet for particles, and;
moving the valve to the closed position.

The present invention is not limited to the embodiment shown, but extends also to other embodiments falling within the scope of the appended claims.

The invention claimed is:

1. A filter device for removing particles from a liquid, the filter device comprising:
a fluid chamber;
an inlet for liquid;
an outlet for filtered liquid;
an outlet for particles;
a sieve;
a flow directing mechanism for inducing a vortex flow around a vortex axis in said fluid chamber; and
an inlet chamber coupled to the inlet;
wherein the outlet for particles is coupled to the fluid chamber at a location substantially perpendicular to the vortex axis;
wherein the inlet for liquid, the outlet for filtered liquid, and the outlet for particles are each coupled to the fluid chamber;
wherein the sieve is arranged in the fluid chamber and upstream from the outlet for filtered liquid;
wherein the inlet chamber is delimited from the fluid chamber by a wall member;
wherein the wall member comprises at least one opening being shaped to induce the vortex flow in the fluid chamber; and wherein the inlet chamber comprises an inlet chamber sieve for sifting the liquid upstream from the wall member.

2. The filter device according to claim 1, wherein the inlet chamber sieve is supported by the wall member.

3. The filter device according to claim 1, wherein the sieve is arranged downstream from the outlet for particles.

4. The filter device according to claim 1, wherein the sieve has a cylindrical shape.

5. The filter device according to claim 4, wherein the sieve is coaxially arranged around the outlet for filtered liquid between the wall member and a wall of the fluid chamber.

6. The filter device according to claim 1, comprising a housing comprised of two housing parts.

7. The filter device according to claim 6, wherein the wall member is secured between the two housing parts.

8. The filter device according to claim 7, wherein:
the sieve is coaxially arranged around the outlet for filtered liquid, between the wall member and the wall of the fluid chamber; and
the sieve is secured between one of the two housing parts and the wall member.

9. A filter device for removing particles from a liquid, the filter device comprising:
a fluid chamber;
an inlet for liquid;
an outlet for filtered liquid;
an outlet for particles;
a flow directing mechanism for inducing a vortex flow around a vortex axis in said fluid chamber; and
an inlet chamber coupled to the inlet;
wherein the inlet chamber is delimited from the fluid chamber by a wall member;
wherein the inlet chamber comprises an inlet chamber sieve for sifting the liquid upstream from the wall member;
wherein the inlet chamber sieve is provided with a plurality of truncated cones or pyramids;
wherein an opening from an upstream top to a downstream base of a truncated cone or pyramid of the plurality of truncated cones or pyramids is oriented to a direction of liquid flow;
wherein cross sections of the truncated cones or pyramids diverge in the direction of the liquid flow;
wherein the inlet for liquid, the outlet for filtered liquid, and the outlet for particles are each coupled to the fluid chamber; and
wherein the outlet for particles is coupled to the fluid chamber at a location substantially perpendicular to the vortex axis.

10. The filter device according to claim 9, wherein:
the fluid chamber is substantially cylindrical; and
the outlet for particles is arranged at the cylindrical wall.

11. The filter device according to claim 9, wherein:
the fluid chamber has a varying diameter; and
the outlet for particles is arranged at a location of the fluid chamber with largest diameter.

12. The filter device according to claim 9, wherein:
at least a part of an inner wall of the fluid chamber is provided with a groove; and
the outlet for particles is arranged in the groove.

13. The filter device according to claim 9, wherein the outlet for particles is provided with a valve movable between an open position and a closed position.

14. The filter device according to claim 9, wherein the inlet chamber sieve is supported by the wall member.

15. The filter device according to claim 9, wherein the normal of the plane of the upstream top of the truncated cone or pyramid is oriented at an angle relative to the direction of liquid flow.

16. The filter device according to claim 9, wherein:

the inlet chamber comprises an outlet for particles blocked by the inlet chamber sieve; and the filter device further comprises blocked particle outlet valve arranged to block any axial flow through the outlet for blocked particles in a closed position.

17. The filter device according to claim 16, wherein:

the inlet chamber further comprises a second inlet for flushing the blocked particles from the inlet chamber to an outlet for blocked particles; and the filter device further comprises a second inlet valve arranged to block any axial flow through the second inlet when in a closed position.

18. The filter device according to claim 9, wherein the wall member comprises a plurality of tangentially oriented nozzles for inducing the vortex flow in the fluid chamber.

* * * * *